United States Patent
Chahal et al.

(10) Patent No.: US 10,558,549 B2
(45) Date of Patent: Feb. 11, 2020

(54) METHOD AND SYSTEM FOR PRE-DEPLOYMENT PERFORMANCE ESTIMATION OF INPUT-OUTPUT INTENSIVE WORKLOADS

(71) Applicant: TATA CONSULTANCY SERVICES LIMITED, Mumbai (IN)

(72) Inventors: Dheeraj Chahal, Mumbai (IN); Rupinder Singh Virk, Mumbai (IN); Manoj Karunakaran Nambiar, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 495 days.

(21) Appl. No.: 15/361,129

(22) Filed: Nov. 25, 2016

(65) Prior Publication Data
US 2017/0153963 A1    Jun. 1, 2017

(30) Foreign Application Priority Data
Nov. 26, 2015   (IN) .......................... 4445/MUM/2015

(51) Int. Cl.
*G06F 3/00* (2006.01)
*G06F 11/34* (2006.01)
(Continued)

(52) U.S. Cl.
CPC ...... *G06F 11/3485* (2013.01); *G06F 11/3006* (2013.01); *G06F 11/3041* (2013.01);
(Continued)

(58) Field of Classification Search
CPC ... G06F 13/00; G06F 7/00; G06F 7/04; G06F 9/302–9/318; G06F 3/00; G06F 7/02; G06F 9/30; G06K 11/00
(Continued)

(56) References Cited

U.S. PATENT DOCUMENTS 6,101,524 A    8/2000   Choi et al.
7,720,955 B1 *  5/2010  Kelly .................. G06F 11/3447
                                                   709/223

(Continued)

*Primary Examiner* — Tim T Vo
*Assistant Examiner* — Kim T Huynh
(74) *Attorney, Agent, or Firm* — Finnegam, Henderson, Farabow, Garrett & Dunner LLP

(57) ABSTRACT

A method and system is provided for pre-deployment performance estimation of input-output intensive workloads. Particularly, the present application provides a method and system for predicting the performance of input-output intensive distributed enterprise application on multiple storage devices without deploying the application and the complete database in the target environment. The present method comprises of generating the input-output traces of an application on a source system with varying concurrencies; replaying the generated traces from the source system on a target system where application needs to be migrated; gathering performance data in the form of resource utilization, through-put and response time from the target system; extrapolating the data gathered from the target system in order to accurately predict the performance of multi-threaded input-output intensive applications in the target system for higher concurrencies.

11 Claims, 15 Drawing Sheets

(51) Int. Cl.
*G06F 11/36* (2006.01)
*G06F 11/30* (2006.01)

(52) U.S. Cl.
CPC ........ *G06F 11/3051* (2013.01); *G06F 11/349* (2013.01); *G06F 11/3414* (2013.01); *G06F 11/364* (2013.01)

(58) Field of Classification Search
USPC ...................................... 710/11–22; 702/182
See application file for complete search history.

(56) References Cited

U.S. PATENT DOCUMENTS

| | | |
|---|---|---|
| 9,052,967 B2 | 6/2015 | Gao et al. |
| 2004/0054515 A1* | 3/2004 | Todi .................... G06F 11/3461 703/22 |
| 2012/0030657 A1 | 2/2012 | Gao et al. |
| 2016/0188431 A1* | 6/2016 | Chahal ................ G06F 11/3447 702/182 |
| 2017/0116034 A1* | 4/2017 | Kattepur ................. G06F 11/34 |
| 2018/0137027 A1* | 5/2018 | Breitgand ........... G06F 11/3428 |

* cited by examiner

METHOD AND SYSTEM FOR PRE-DEPLOYMENT PERFORMANCE ESTIMATION OF INPUT-OUTPUT INTENSIVE WORKLOADS

PRIORITY CLAIM

This U.S. patent application claims priority under 35 U.S.C. § 119 to: India Application No. 4445/MUM/2015, filed on 26 Nov. 2015. The entire contents of the aforementioned application are incorporated herein by reference.

TECHNICAL FIELD

The present invention generally relates to predicting the performance of distributed enterprise application. More particularly, the present invention relates to predicting the performance of input-output intensive distributed enterprise application on multiple storage devices without deploying the application and the complete database in the target environment.

BACKGROUND

The most efficient method to find the performance of an application on a storage system is evaluating the application by running on a platform of interest. However, migrating the application to a new environment and testing for the performance is a non-trivial and extremely daunting task. It requires a lot of effort to set it up and subsequently fine tune it. Another close approach is running the synthetic workload generated by input-output subsystem and characterization tools. The synthetic workloads have access pattern very similar to that of the applications. Though this approach is relatively easier but, in most cases, does not reproduce the characteristics of the applications or the workload accurately.

The use of trace for input-output profiling has been there for many years now but its usage has found traction in recent years for predicting the performance in a cloud based environment Prior illustrates creating an artificial workload to predict the performance of input-output intensive distributed enterprise applications, but the most significant issue with this approach is that the actual application workload is not run or tested in the target environment. Even though the approach does not require replicating the database on target architecture, but still it remains an extremely complicated procedure.

Further, prior art also illustrates predicting the performance of web application on cloud based environment, but even though such prior art is capable of predicting the end-to-end performance of multiple resources with high accuracy, it remains a huge challenge for them to hold good for high concurrency i.e large number of users.

Thereby, predicting the performance of input-output intensive distributed enterprise application on multiple storage devices without deploying the application and the complete database in the target environment is still considered as one of the biggest challenges of the technical domain.

SUMMARY

Embodiments of the present disclosure present technological improvements as solutions to one or more of the above-mentioned technical problems recognized by the inventors in conventional systems. For example, in one embodiment, a In another embodiment of the present invention, a computer implemented method is provided for predicting performance of input-output intensive enterprise application on target systems connected to advanced storage devices. The present method comprises of generating the input-output traces of an application on a source system with varying concurrencies; replaying the generated traces from the source system on a target system where application needs to be migrated; gathering performance data in the form of resource utilization, through-put and response time from the target system; extrapolating the data gathered from the target system in order to accurately predict the performance of multi-threaded input-output intensive applications in the target system for higher concurrencies.

In another embodiment of the present invention, a system (200) for predicting performance of input-output intensive enterprise application on a target system is provided. The system (200) has three major components: an I/O trace capture module (202), an I/O trace replay module (204) and an extrapolation module (206). The I/O trace capture module (202) generates the input-output traces of an application on a source system with varying concurrencies. The I/O trace replay module (204) replays the generated traces on a target system and gathers performance data in the form of resource utilization, through-put and response time from the target system. The extrapolation module (206) extrapolates the data gathered from the target system in order to accurately predict the performance of multi-threaded input-output intensive applications in the target system for higher concurrencies In yet another embodiment, the disclosed subject matter provides a computer program product for pre-deployment performance estimation of input-output intensive workloads, the computer program product comprising a non-transitory computer readable storage medium having program instructions embodied therewith, the program instructions executable by a processor to cause the processor to perform a method comprising the steps of generating the input-output traces of an application on a source system with varying concurrencies using an I/O trace capture module (210) followed by replaying the generated traces from the source system on a target system wherein the target system is to which the application needs to be migrated using an I/O trace replay module (212). The method further comprises the step of collecting performance data in the form of resource utilization, through-put time and response time from the target system using the I/O trace replay module (212); and lastly extrapolating the data gathered from the target system in order to accurately predict the performance of multi-threaded input-output intensive application in the target system using an Extrapolation module (214).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
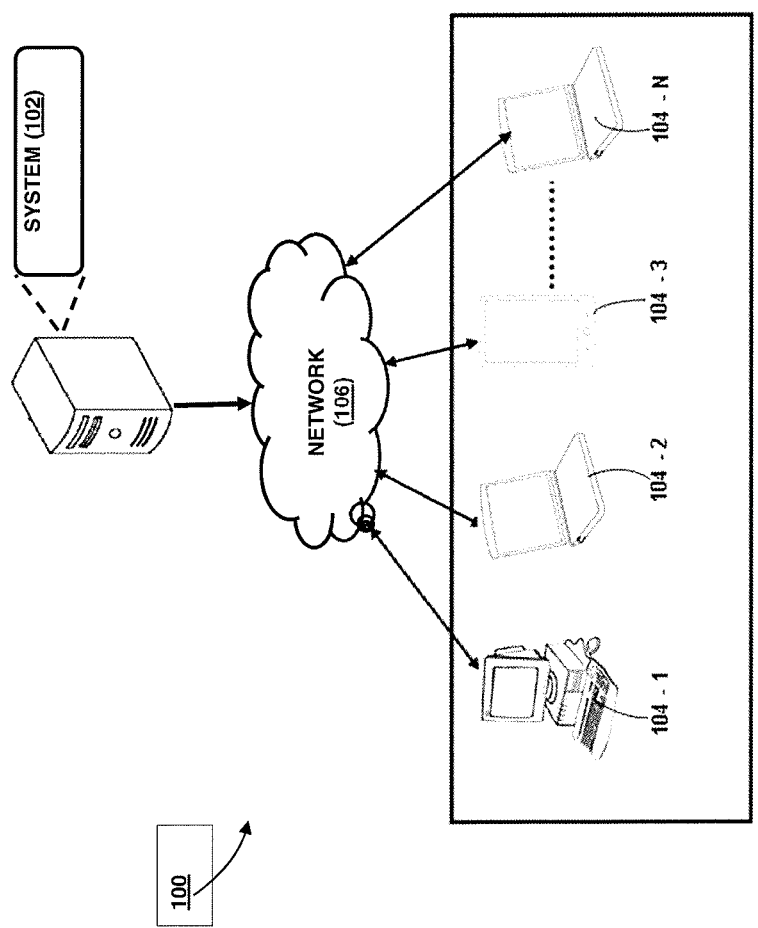
FIG. 1: illustrates a network implementation of a system for pre-deployment performance estimation of input-output intensive workloads, in accordance with an embodiment of the present subject matter.

The present application provides a computer implemented method and system for pre-deployment performance estimation of input-output intensive workloads. Referring now to FIG. 1, a network implementation 100 of a system 102 for pre-deployment performance estimation of input-output intensive workloads is illustrated, in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. In another embodiment, it may be implemented as custom built hardware designed to efficiently perform the invention disclosed. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
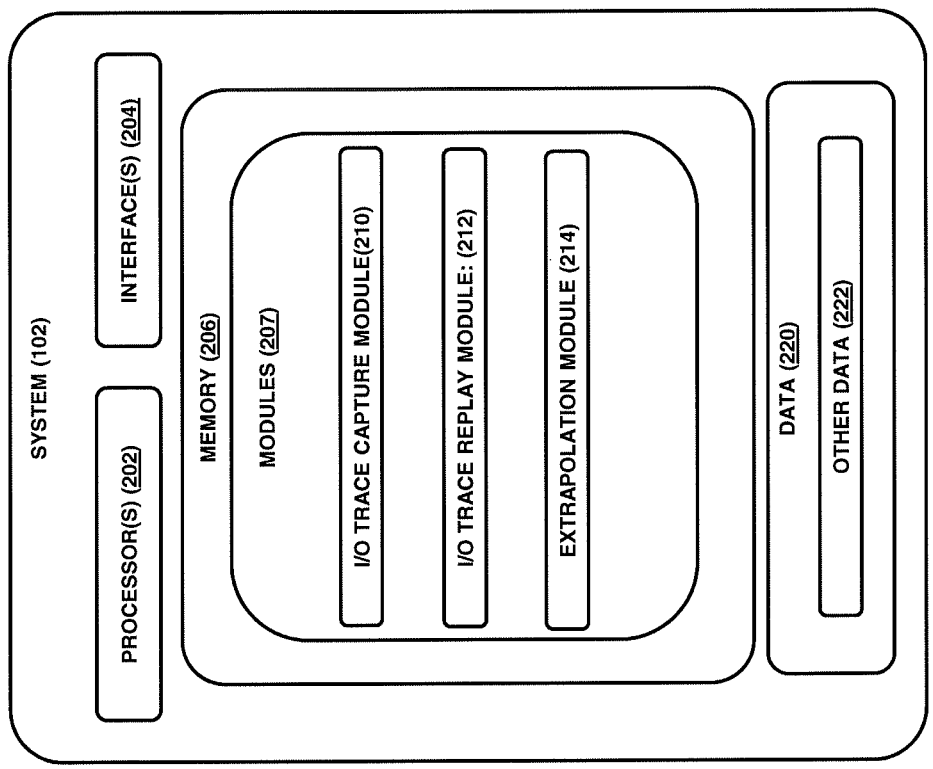
FIG. 2: shows block diagrams illustrating the system for pre-deployment performance estimation of input-output intensive workloads, in accordance with an embodiment of the present subject matter.

In one embodiment the present invention, referring to FIG. 2, describes a detailed working of the various components of the system 102.

A system (102) for re-deployment performance estimation of input-output intensive workloads; comprising a processor (202), a memory (204), operatively coupled with said processor. In an aspect In an embodiment of the present disclosure, a system (200) has three major components: an I/O trace capture module (210), an I/O trace replay module (212) and an extrapolation module (214). The I/O trace capture module (210) generates the input-output traces of an application on a source system with varying concurrencies. The I/O trace replay module (212) replays the generated traces on a target system and gathers performance data in the form of resource utilization, through-put and response time from the target system. The extrapolation module (214) extrapolates the data gathered from the target system in order to accurately predict the performance of multi-threaded input-output intensive applications in the target system.

In an embodiment of the invention, the I/O trace capture module (210) generates the traces in the user mode. There are multiple ways and tools to trace the I/O calls of an applications depending upon the layer they operate on e.g. kernel, user space or a combination of both. The user mode requires no modification in the application or the kernel. The input-output profile trace of AOI is captured using the strace utility in linux system. In order to reduce the strace overhead and the size of trace file, only input-output related calls are captured and the following I/O system calls are captured: read( ), write( ), pread( ), pwrite( ), Iseek( ), fsync( ), open( ), close( ). Each row in the captured trace consists of process ID, timestamp value, offset and the input-output system call. In order to capture the trace, all the thread IDs are first found that are spawned by MySQL and then strace is attached to each of these IDs. Thus multiple trace output files are created. In order to maintain the same order of the execution on the target system, all these files are merged in to a single file and then the output system calls are sorted according to the timestamp value.

In another embodiment of the invention, the I/O trace replay module (212) copies the database files of the application to a temporary directory on the target system. The access path to any file in the trace file is replaced with the path to that file in the temporary directory. Commonly used input-output tracing tools are used to replay the input-output trace captured on the test system. The replay executes the input-output operations on the target system as recorded in the trace on the test system. Studies have shown such commonly used tools scale within a difference of few percentage points when compared with the original application. One of the drawback with the tools is that they are single threaded. Hence replaying the trace for high concurrency is a challenge. The features of the tools are modified to support multithreading. One of the challenges associated with the trace-replay method is maintaining the realism of the workload when load-profile is replayed on a target system. The input-output system calls are captured along with their timestamp. When the trace is replayed on the target system it is ensured that input-output calls are executed at the same time interval as in the original system so that workload is replicated correctly.

In another embodiment of the invention, the extrapolation module (214) uses a specific method for extrapolating the performance of an application for a large number of users on a given platform. The method, at first, takes load testing results as input from for a small number of users in terms of throughput and resource utilization. Though the input-output trace is replayed by the I/O trace replay module (212) and disk utilization of storage system is captured only on the database server, the extrapolation module (214) predicts the end-to-end response time and throughput of the application.

In order to extrapolate throughput, the maximum throughput based on the resource utilization information and service demand is first estimated. A combination of linear regression and another statistical technique called sigmoid curve (or S curve) are used to predict the performance until the application encounters the first bottleneck. Linear regression is used to predict the performance until throughput reaches the half of the maximum throughput and beyond that point sigmoid curve is fit in till the throughput reaches 90% of maximum value. Next, the extrapolation module (214) uses a black-box technique that does not require detailed modeling of the application functionalities nor does it require any architectural simulation for the target system. At least two measurements are performed on the target platform and using the performance statistics it extrapolates the throughput, response time and maximum number of users supported by the systems. Then, the bottleneck resources are pinpointed as well. Furthermore, resource utilization information at various servers in a system (for example, application server and database server) is projected. However, the extrapolation module (214) makes an assumptions that there are no software bottleneck in the application of interest. For extrapolation, user performance data obtained by running traces for two concurrency levels on the target system is sufficient. To improve the prediction accuracy, test system traces are run on the target system for multiple concurrencies as discussed in previous section. The resource utilization for these multiple concurrencies is used as input and extrapolated for higher concurrencies to obtain performance metrics like resource utilization, throughput and response time.

Figure 3:
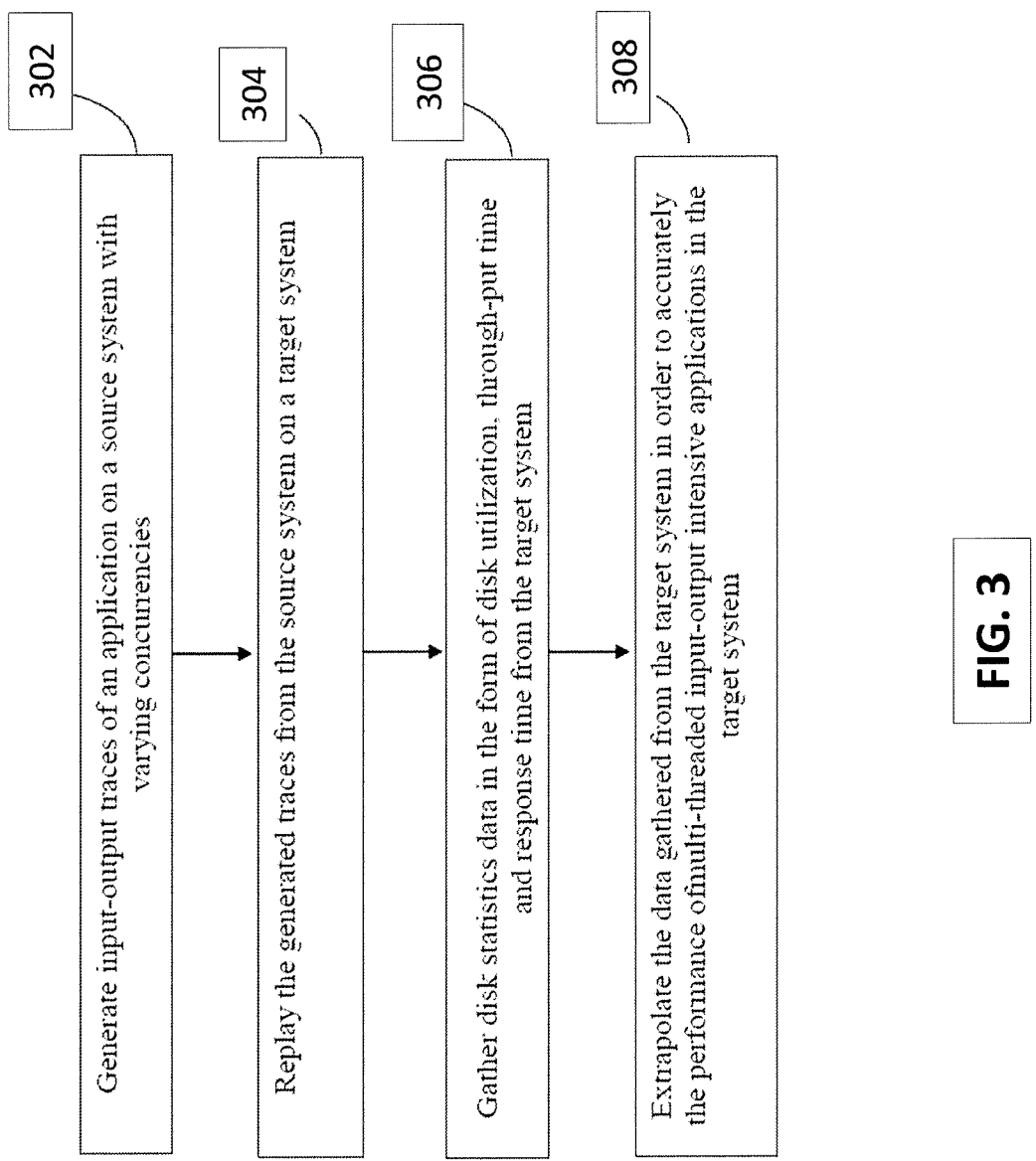
FIG. 3: shows a flowchart illustrating the method for pre-deployment performance estimation of input-output intensive workloads, in accordance with an embodiment of the present subject matter.

Referring now to FIG. 3 a flow chart illustrating the method for pre-deployment performance estimation of input-output intensive workloads is shown.

The process starts at step 302, the input-output traces of an application on a source system with varying concurrencies is generated. At step 304, the generated traces from the source system are replayed on a target system. At step 306, performance data in the form of resource utilization, through-put and response time are gathered from the target system. At step 308, the data gathered from the target system are extrapolated in order to accurately the performance of multi-threaded input-output intensive applications in the target system.

The following paragraphs contain experimental data which is intended to help a person skilled in the art understand the working of the invention. The experimental data is not to be construed as limiting the scope of the invention which is limited only by the claims.

In order to perform the experiment two applications equiz and JPet-Store are used. Application equiz provides an automated web-enabled technology platform to assess and verify technical skills of the people in a large software company. The application is implemented with java servlets, stored procedures and includes an automatic code evaluation (ACE) framework. JPetStore is an eCommerce J2EE application benchmark which allows users to browse and search for different types of pets in five top level categories. It provides detailed information on prices, inventory and images for all items within each category. Along with login authentication it provides full shopping cart facility that includes credit card option for billing and shipping.

While performing the experiment all test applications are deployed on apache tomcat server and MySQL is used as backend. The think time between the application pages is fixed at 5 sec. Each application is run for a 20 minutes durations. The storage system configurations that are used are provided in table 1 below. A low-end HDD as test storage system and high-end HDD or SSD as target storage system.

TABLE 1

| Storage Type | Disk Model | RPM | No. of Disk | IQ Scheduler | File System | Interface | System Configuration | Linux kernel |
|---|---|---|---|---|---|---|---|---|
| Low End HDD | Caviar SE Serial ATA Drive | 7200 | 1 | CFQ | ext4 | 300 Mb/s Serial ATA 2.0 | 8 Core Xeon CPU@ 2.6 Ghz, 6 MB L2cache | Cent OS 6.5, 2.6.32 |
| High End HDD | HP | 10000 | 1 | CFQ | ext4 | Dual Port SAS, 6 GB/s | 16 Core Xeon CPU@ 2.4 Ghz, 12 MB L2cache | Cent OS 6.6, 2.6.32 |
| SDD | Virident Systems Inc. FlashMax drive Micron slc-32 | — | 1PCIe | Default | ext3 | — | 16 Core Xeon CPU@ 2.4 Ghz, 12 MB L2cache | Cent OS 6.6, 2.6.32 |

The IO trace of applications on the database was captured for multiple concurrencies using widely available linux utility strace. The same trace files are run on the target systems using iorepaly. The IOreplay is run exact mode so that the trace is executed on the target system in the same time as on the source system. This mode of IOreplay preserves the thinktime in the original application.

The disk utilization and throughput is measured using iostat utililty for all the concurrencies. The disk utlilization and throughput data point for all the concurrencies are fed into PerfExt which is a tool used in the experiment for the extrapolation purpose. The extrapolated values are compared with the actual performance data. Percentage error in metric prediction is calculated using equation (1)

$$\frac{\text{Application metric} - \text{replay metric}}{\text{Application metric}} * 100 \quad (1)$$

PerfExt, is a tool used for extrapolation in the instant experiments which developed by the inventors for extrapolating the performance of an application for a large number of users on a given platform, however while implementing the method and system disclosed herein any tool capable of extrapolation as described in this specification may be used instead of PerfExt. Working of the PerfExt tool is explained in the following paragraphs.

PerfExt takes load testing results as input from for a small number of users in terms of throughput and resource utilization. Though the 10 trace is replaced and disk utilization of storage system is captured only on the database server but PerfExt predicts the end-to-end response time and throughput of the application.

To extrapolate throughput, PerfExt first estimates the maximum throughput based on the resource utilization information. Linear regression is used to predict the performance until throughput reaches the half of the maximum throughput and beyond that point sigmoid curve is fit in till the throughput reaches 90% of maximum value. PerfExt uses a combination of linear regression and another statistical technique called sigmoid curve (or S curve) to predict the performance until the application encounters the first bottleneck. PerfExt uses a black-box technique that does not require detailed modeling of the application functionalities nor does it require any architectural simulation for the target system.

A single user test is performed on the target platform and using the performance statistics PerfExt extrapolates the throughput, response time and maximum number of users supported by the systems. PerfExt pinpoints the bottleneck resource as well. Furthermore, PerfExt projects resource utilization information at various servers in a system (for example, application server and database server).

PerfExt is able to provide accuracy of about 90% in the throughput and utilization metrics. However, it makes an assumption that there in no software bottleneck in the application of interest.

To perform extrapolation using PerfExt, user performance data obtained by running traces for two concurrency levels on the target system is sufficient. To improve the prediction accuracy, test system traces were run on the target system for multiple concurrencies as discussed in previous section. The resource utilization for these multiple concurrencies is used in the PerfExt as input and extrapolated for higher concurrencies to obtain performance metrics like resource utilization, throughput and response time.

For the purpose of the experiment the disclosed invention was evaluated using two applications namely JpetStore and equiz. The performance of these applications was predicted on a high end HDD and SSD storage systems using the trace generated on low-end HDD.

Experiment 1

Figure 4:
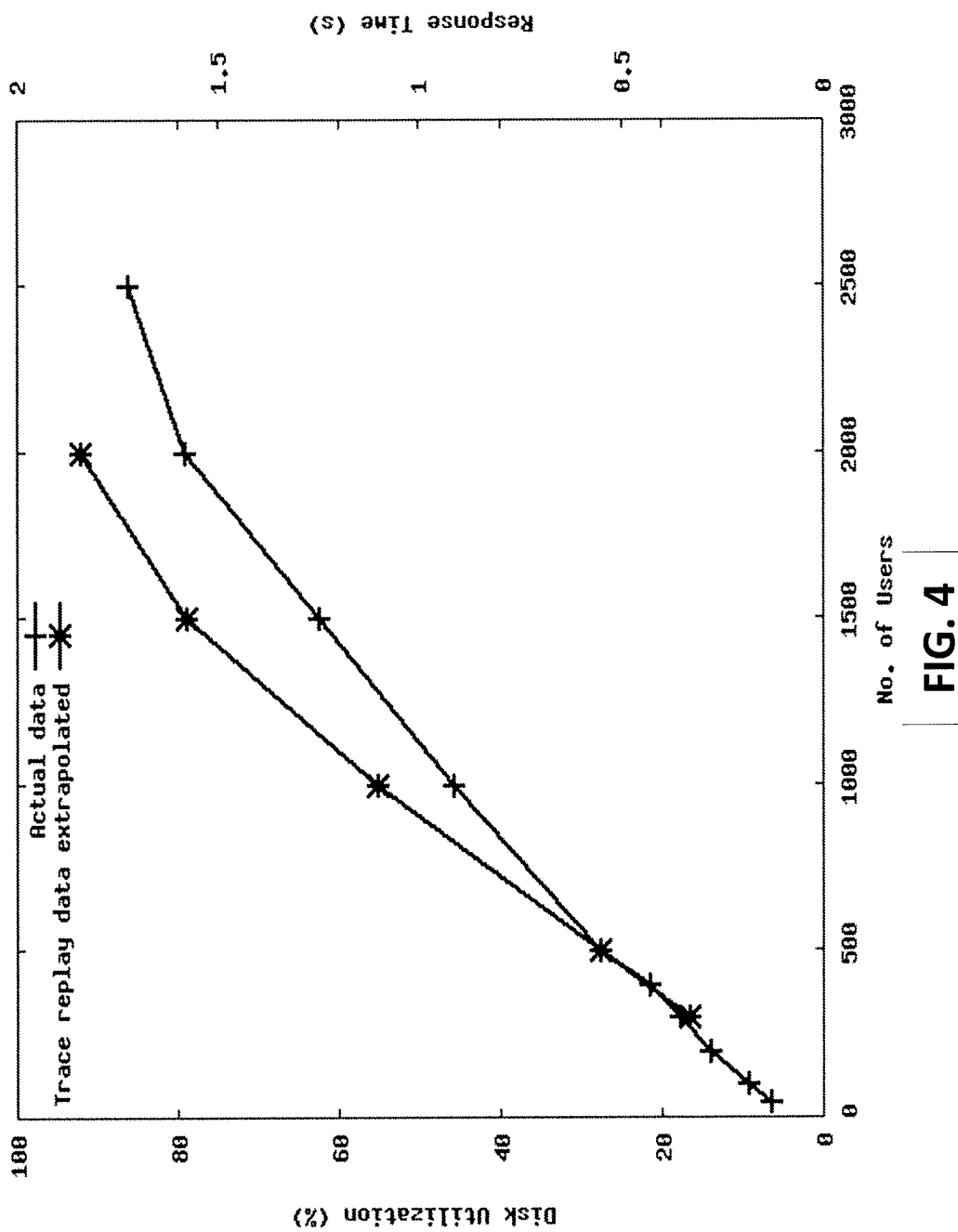
FIG. 4: shows a graph illustrating application vs trace disk utilization extrapolated on the target system for JPetStore application during low end HDD to high end HDD migration in accordance with an exemplary embodiment of the present subject matter.

Low-end HDD to High-end HDD migration prediction: JPetStore application was run on a test system for 50, 100, 200, 300, 400 and 500 users and IO trace files were generated. The trace files are played on the target system. As shown in FIG. 2a, disk utilization obtained upto 500 users using trace from test system is similar to the actual application when run on the target system. The disk utilization is further extrapolated using PerfExt beyond 500 users. As shown in FIG. 4, both PerfExt and actual application run show disk saturation for around 2500 users. Average error in predicting the disk utilization for extrapolated values is less than 15%.

Figure 5:
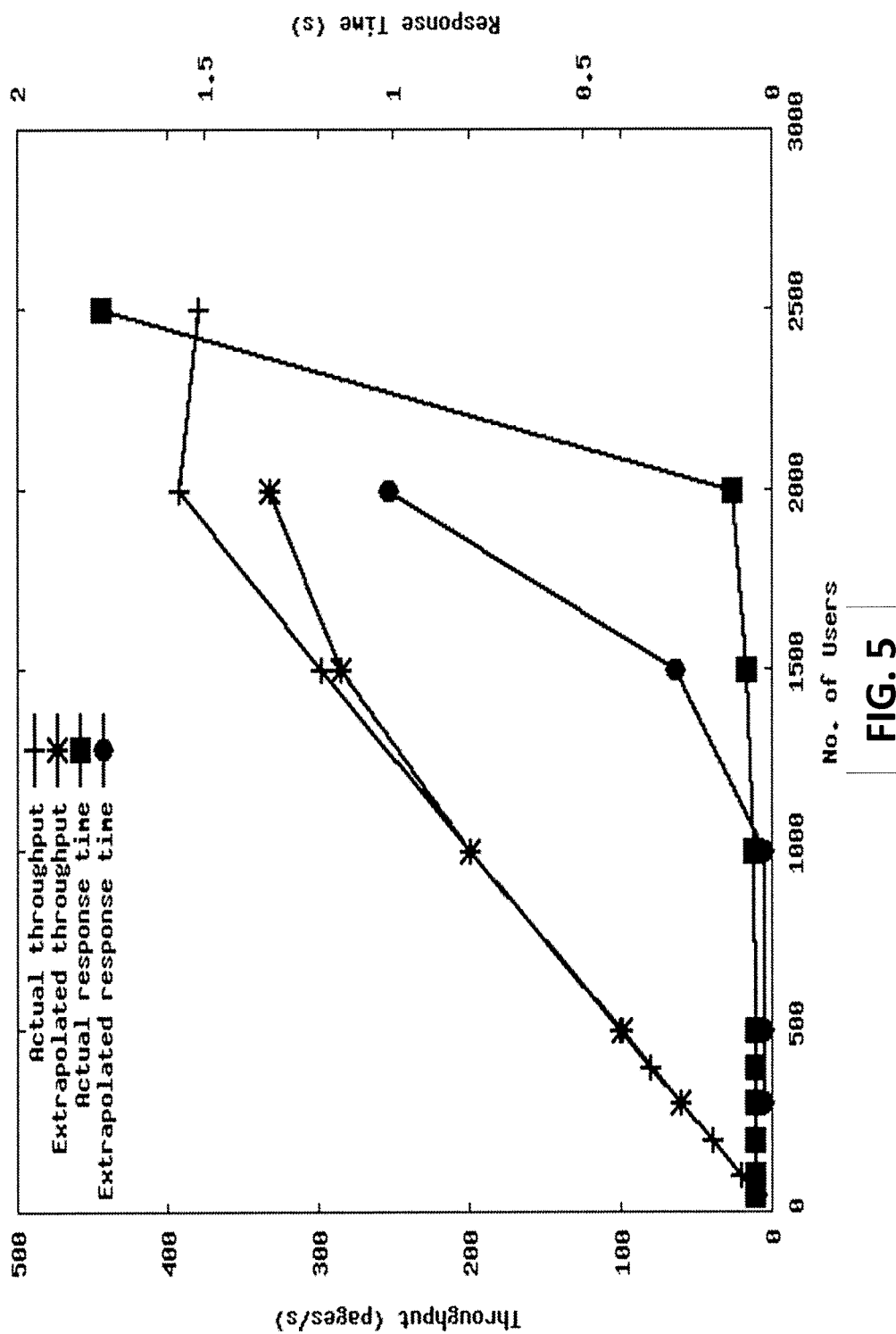
FIG. 5: shows a graph illustrating application and trace throughput extrapolated on the target system and application and trace response time extrapolated on the target system for JPetStore application during low end HDD to high end HDD migration in accordance with an exemplary embodiment of the present subject matter.

Also, throughput measured in pages/s is similar for trace replay when compared with the corresponding application data upto 500 users as shown in FIG. 5. The extrapolated throughput beyond 500 is comparable with actual application. FIG. 5 also illustrates, the predicted response time is comparable to the actual application up to 1500 users. At 2000 users, predicted response time is 1.01 ms and similar response time is observed with actual application for 2200 users. This difference in response time at predicted maximum achievable concurrency of 2000 is due to early bottleneck detection by PerfExt.

Figure 6:
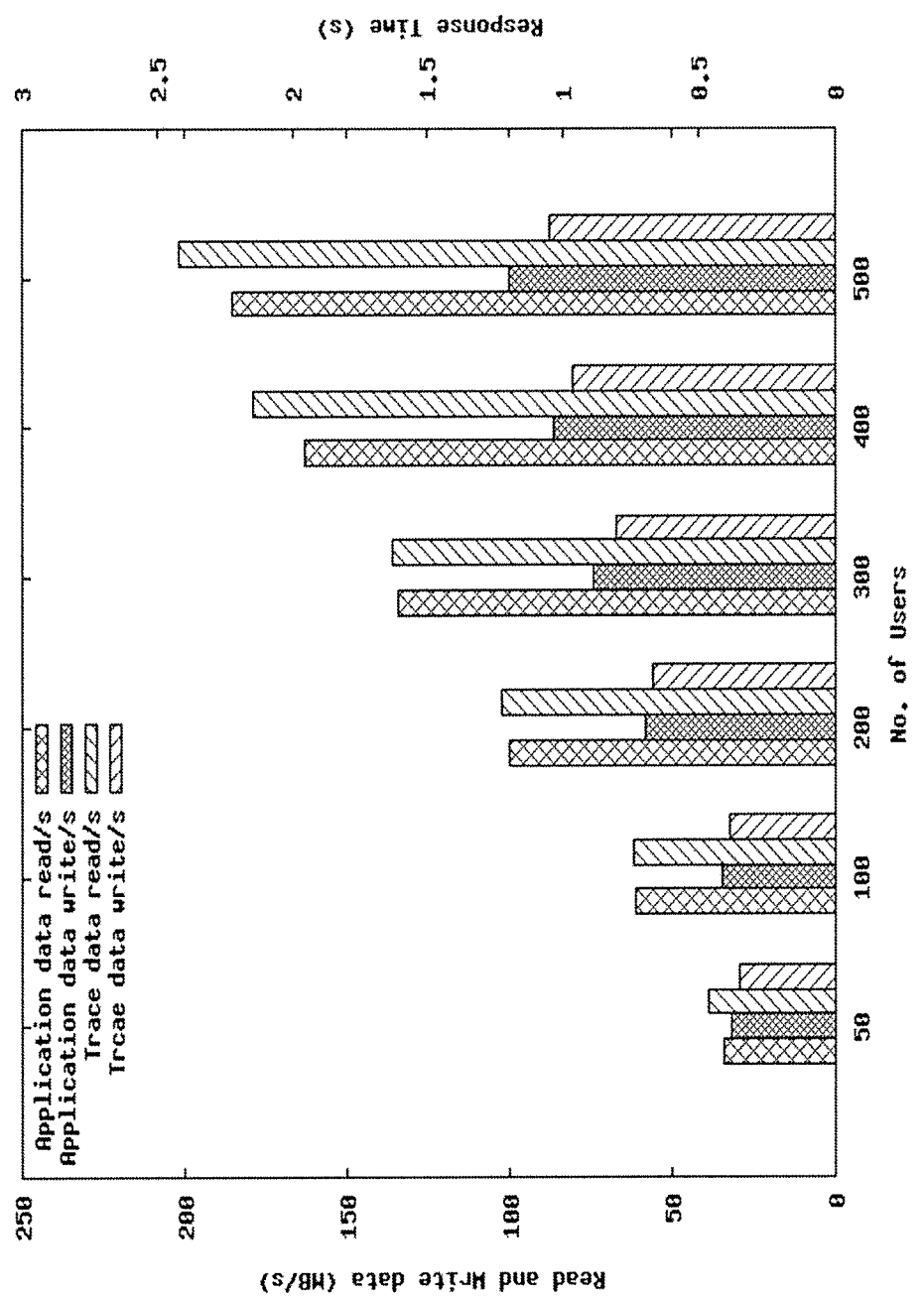
FIG. 6: shows a graph illustrating application vs trace data transfer via read and write system calls for JPetStore application during low end HDD to high end HDD migration in accordance with an exemplary embodiment of the present subject matter.

For validation of trace replay, we compared the data exchanged by the application trace and the actual application. As shown in the FIG. 6, the total data read and written is similar for trace and the actual application for tested number of users.

Figure 7:
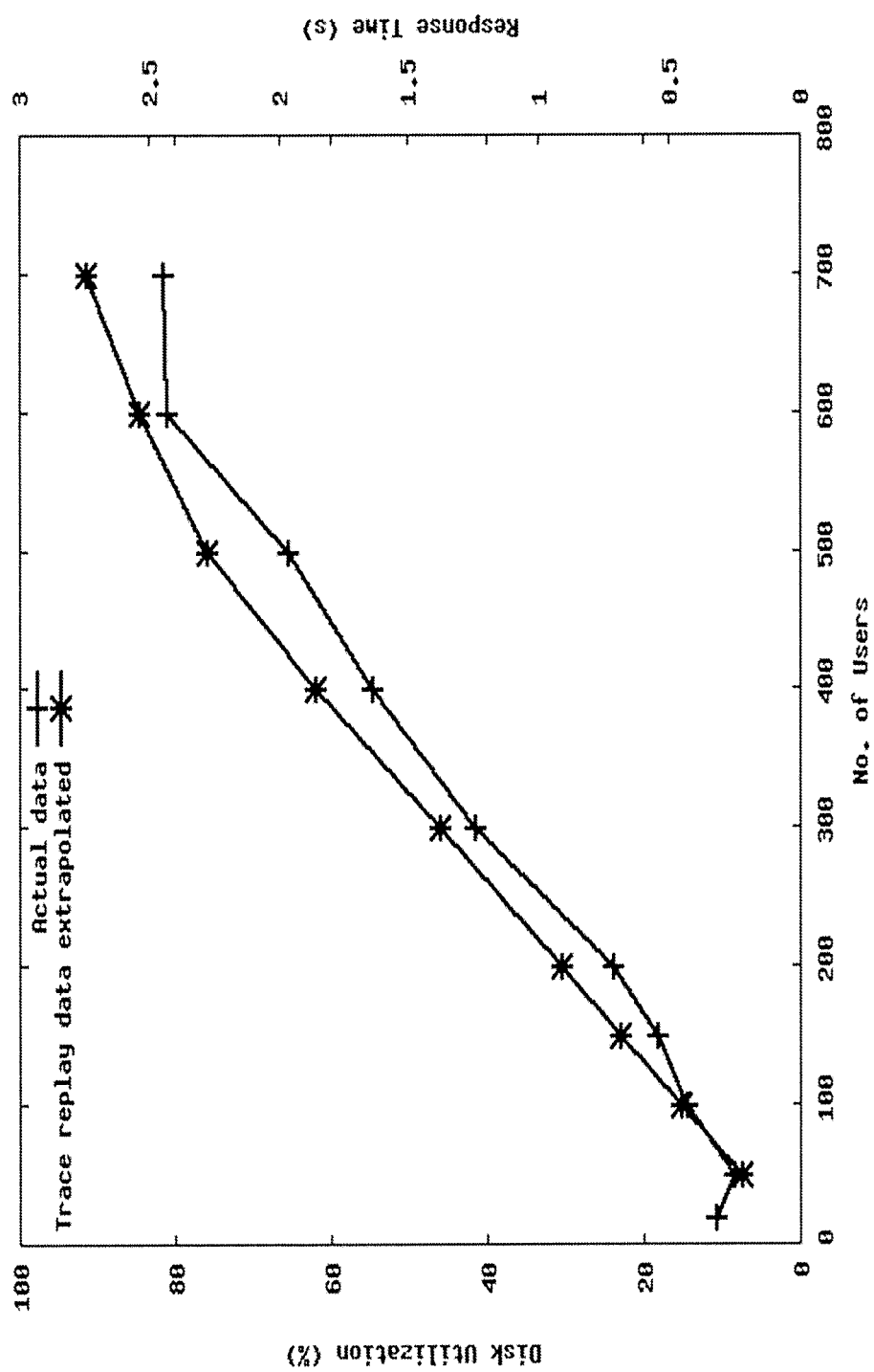
FIG. 7: shows a graph illustrating application vs trace disk utilization extrapolated on the target system for equiz application during low end HDD to high end HDD migration in accordance with an exemplary embodiment of the present subject matter.

The Equiz application was run for 50, 100 and 150 users on the test system and the 10 trace was captured. The trace files are replayed on the target system and performance data is collected. As shown in the FIG. 7, the disk utilization of trace replay on the target system and corresponding application run is similar. When utilization is extrapolated beyond 200 users, the disk bottleneck is predicted at around 750 users by the extrapolation tool while it is observed at 800 users when actual application is run. The average error in utilization prediction is less than 7% for the extrapolation values.

Figure 8:
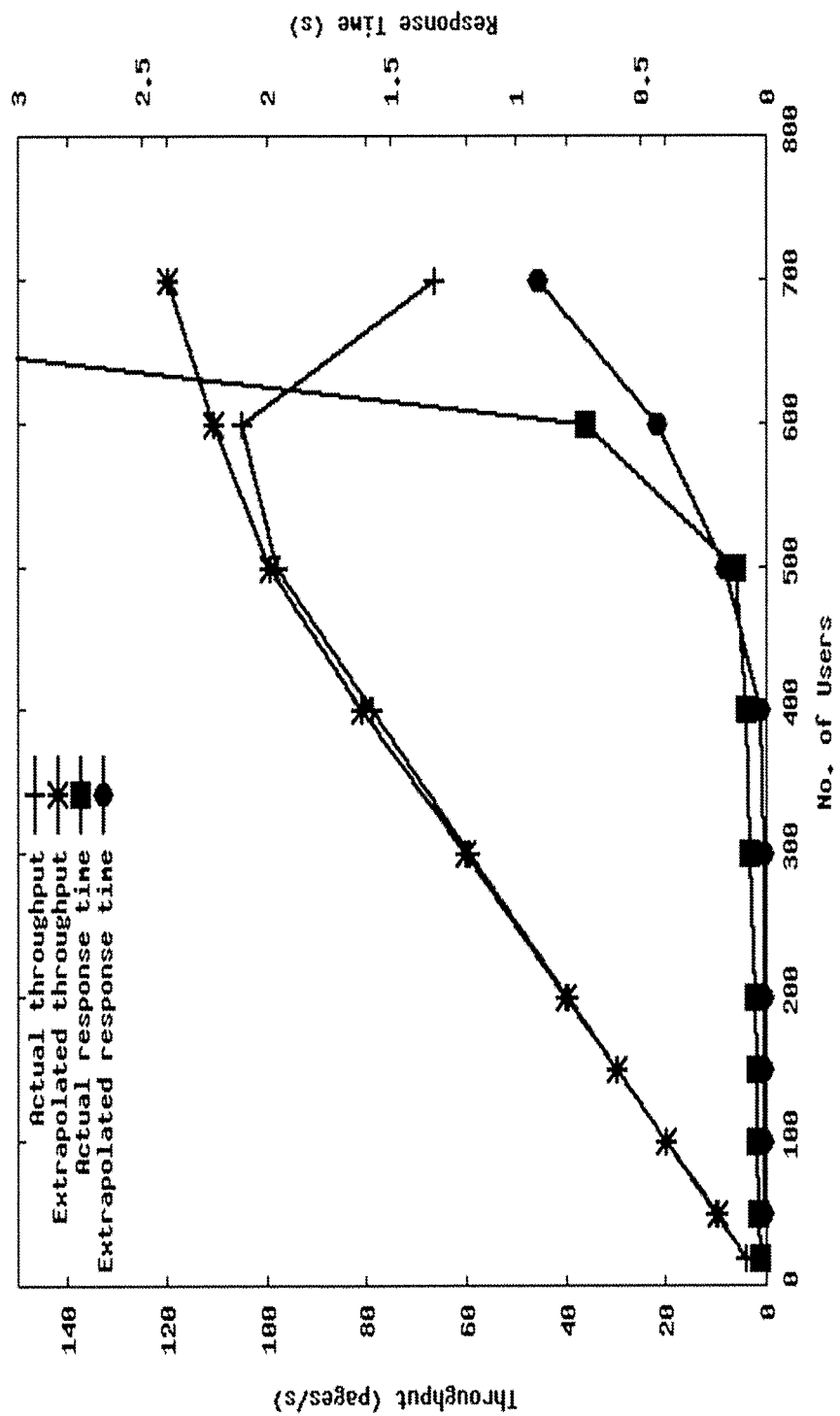
FIG. 8: shows a graph illustrating application and trace throughput extrapolated on the target system and application and trace response time extrapolated on the target system for equiz application during low end HDD to high end HDD migration in accordance with an exemplary embodiment of the present subject matter.

The throughput difference in trace replay and actual application as illustrated in FIG. 8, is insignificant. The extrapolated throughput shows a good match upto 600 users. Also, FIG. 8 shows that the predicted response time is same as observed with actual application run by varying workload. Some difference is observed in throughput and response only at maximum achievable concurrency i.e. 700

Figure 9:
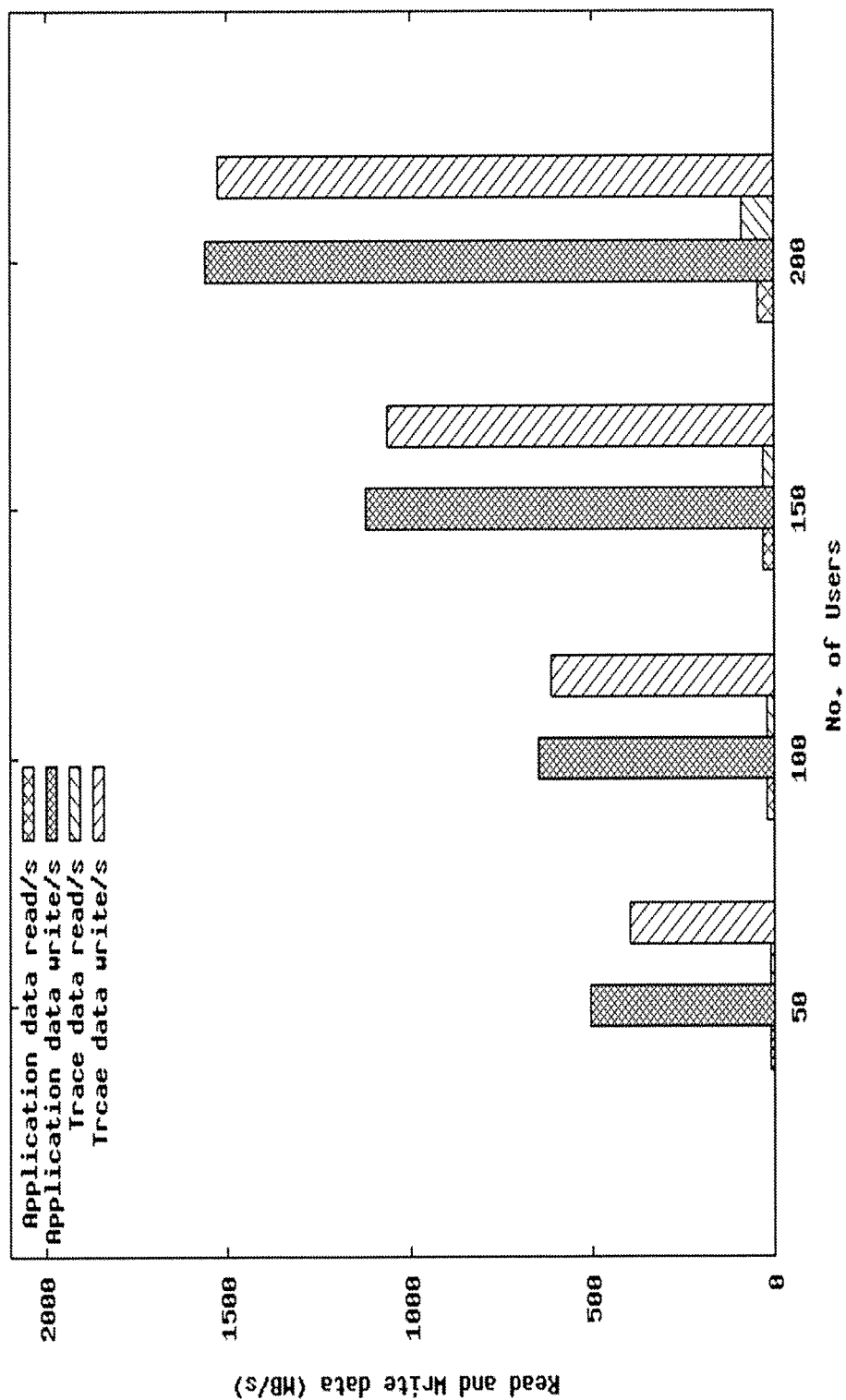
FIG. 9: shows a graph illustrating application vs trace data transfer via read and write system calls for equiz application during low end HDD to high end HDD migration in accordance with an exemplary embodiment of the present subject matter.

As show in FIG. 9, the total data exchanged on the target system by the trace replay and the actual applications is comparable irrespective of the concurrency.

Experiment 2

Figure 10:
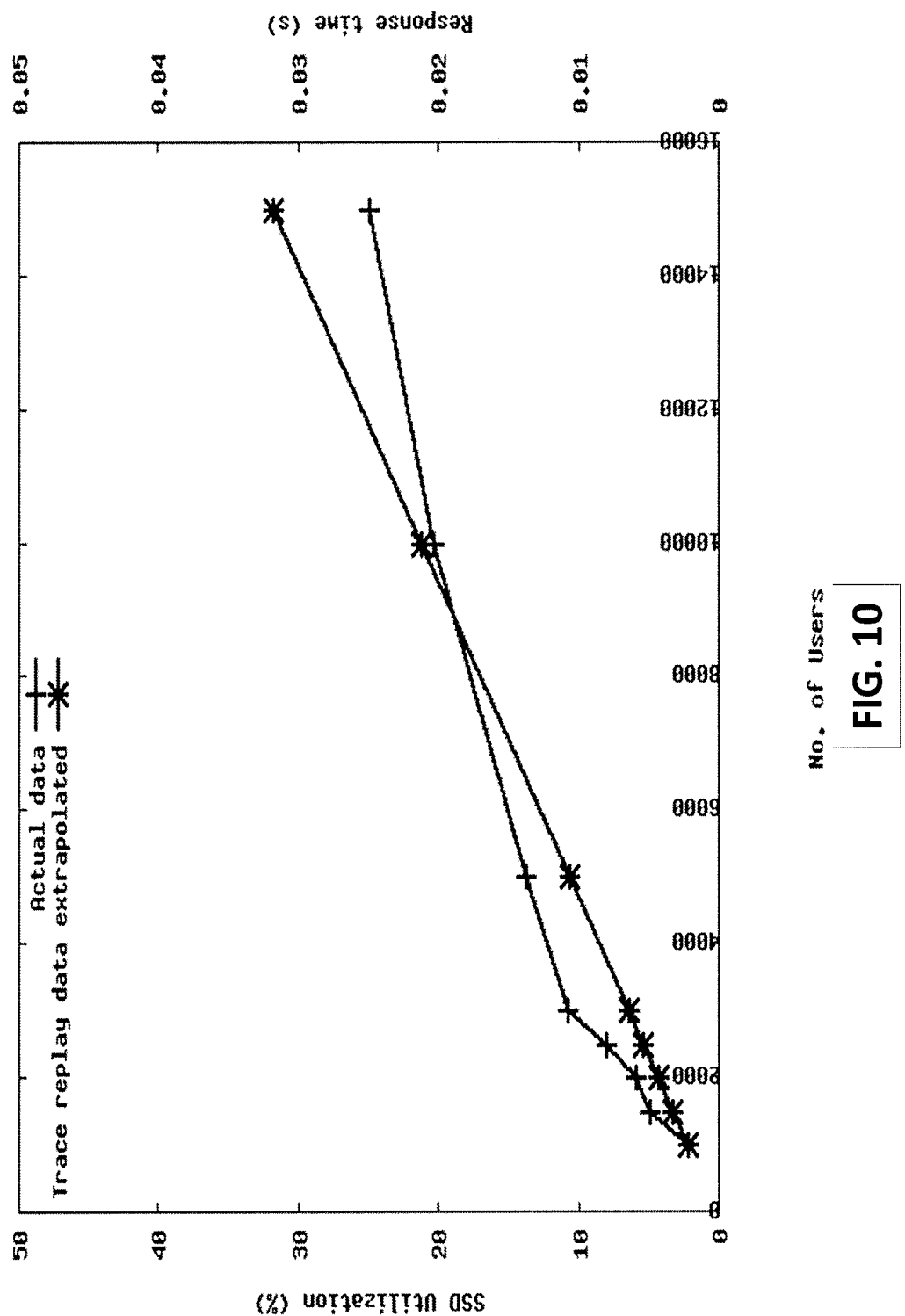
FIG. 10: shows a graph illustrating application vs trace disk utilization extrapolated on the target system for JPetStore application during low end HDD to SDD migration in accordance with an exemplary embodiment of the present subject matter.
Figure 11:
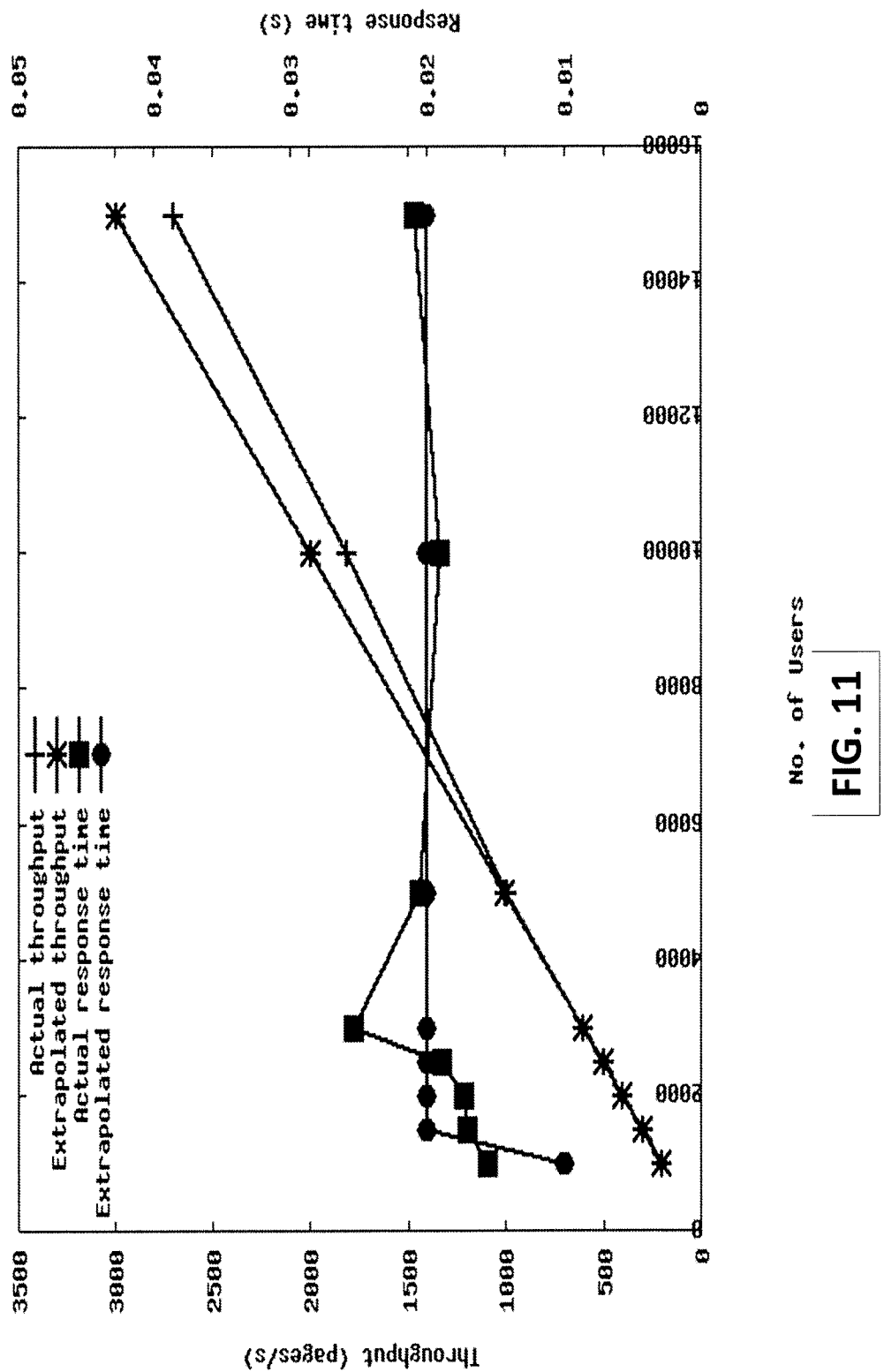
FIG. 11: shows a graph illustrating application and trace throughput extrapolated on the target system and application and trace response time extrapolated on the target system for JPetStore application during low end HDD to SDD migration in accordance with an exemplary embodiment of the present subject matter.
Figure 12:
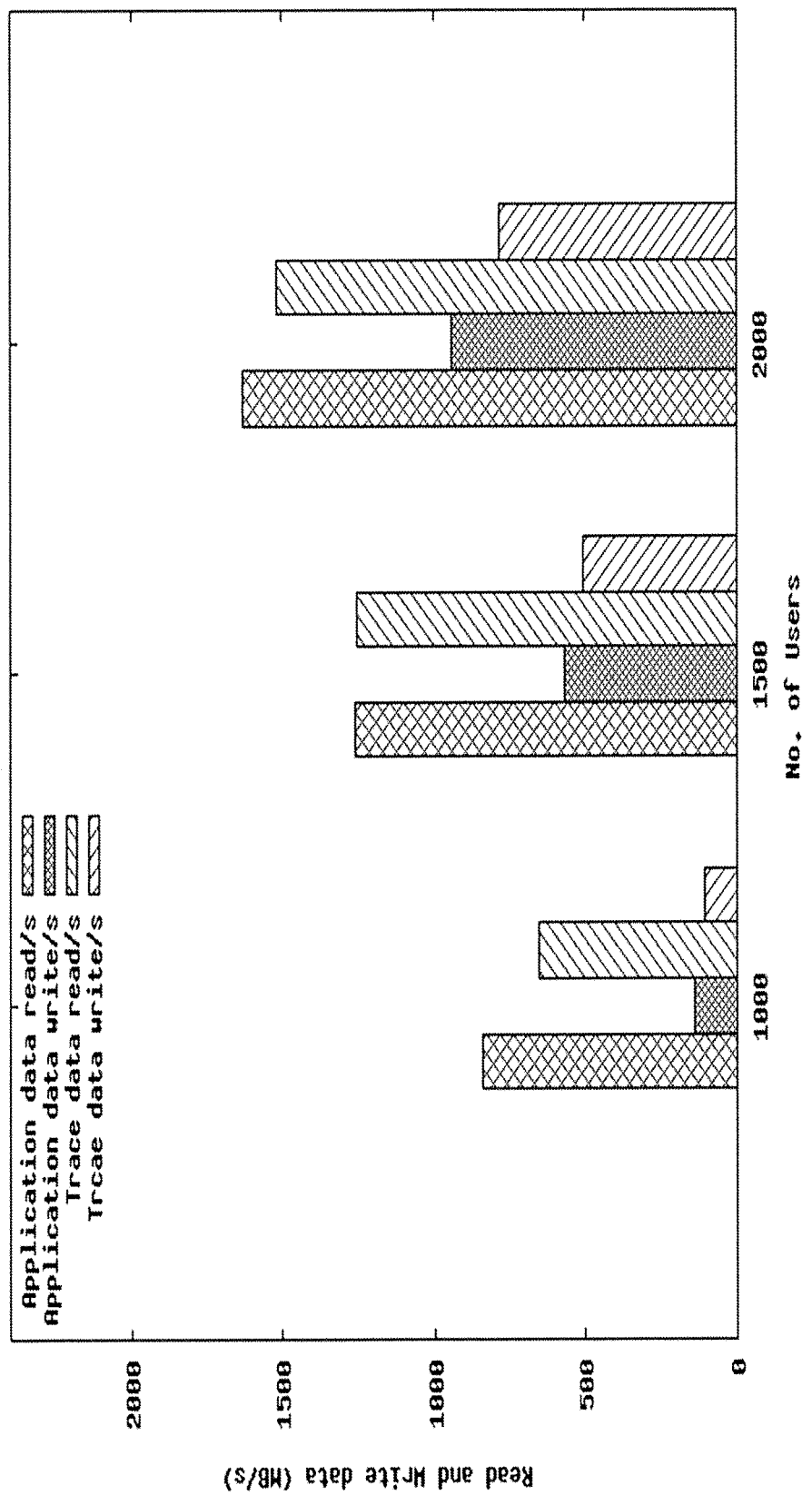
FIG. 12: shows a graph illustrating Application vs trace data transfer via read and write system calls for JPetStore application during low end HDD to SDD migration in accordance with an exemplary embodiment of the present subject matter.

Low-end HDD to SSD migration prediction: The trace generated for two applications i.e. JPetStore and equiz on low-end HDD was also run on SSD and then extrapolated for higher concurrencies using our extrapolation tool. For JPetStore application, as shown in the FIG. 10, the predicted disk utilization is similar to actual utilization up to 1500 users. At maximum 15000 users, predicted utilization is 31.8% against the actual utilization of 24.8%. We observed memory bottleneck at this workload. Also, maximum throughput observed by actual application is 2696 pages/s and comparable to the predicted value of 2994 pages/s as shown in FIG. 11. As shown in FIG. 11 a good match in predicted and actual response time up to 5000 users is observed and the difference widens with increasing workload. This increase in % error can be attributed to the very small values of response time that results in higher experimental errors. Also, the total data read/s and write/s for trace is similar to the actual data read/s and write/s as illustrated in FIG. 12.

Figure 13:
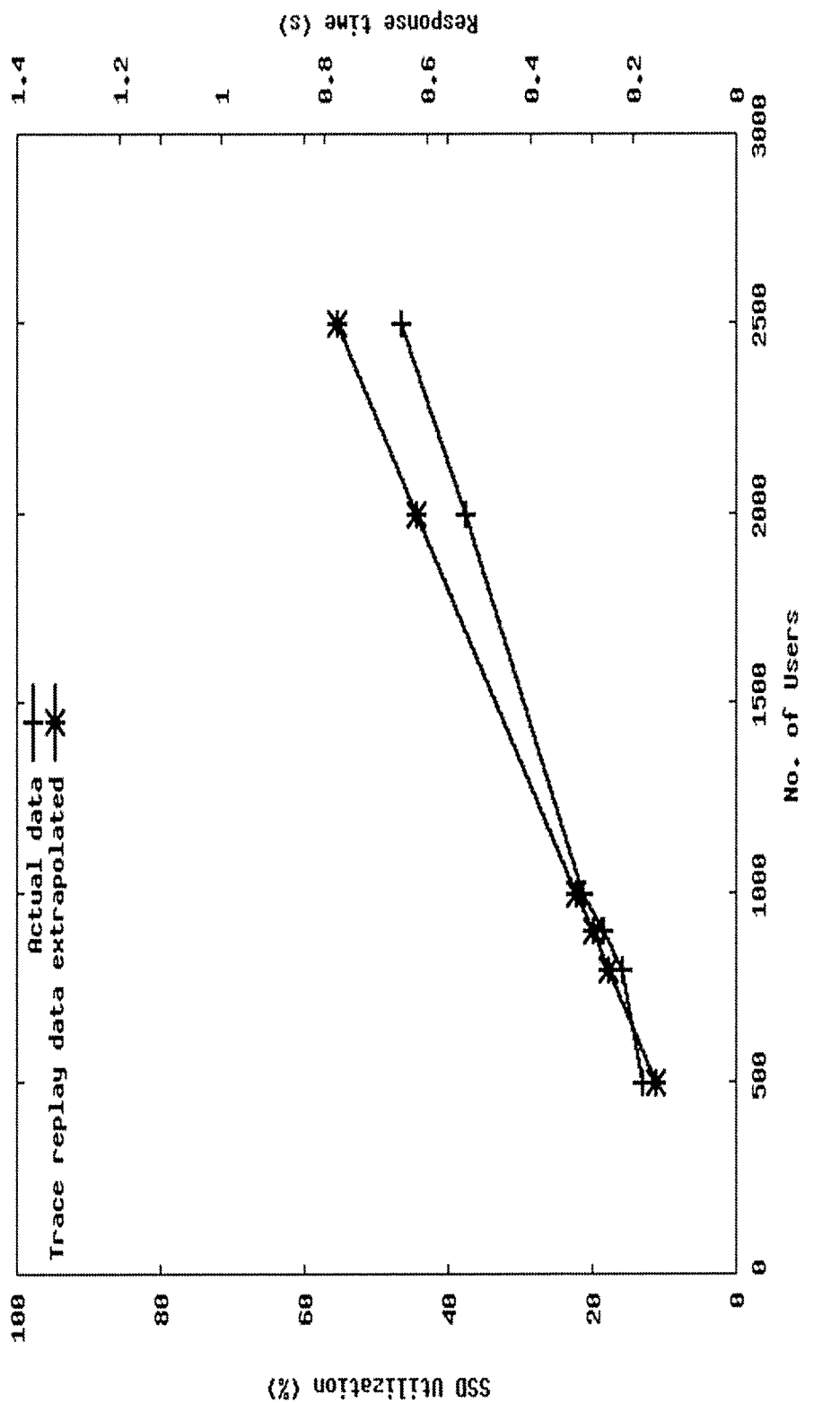
FIG. 13: shows a graph illustrating application vs trace disk utilization extrapolated on the target system for equiz application during low end HDD to SDD migration in accordance with an exemplary embodiment of the present subject matter.
Figure 14:
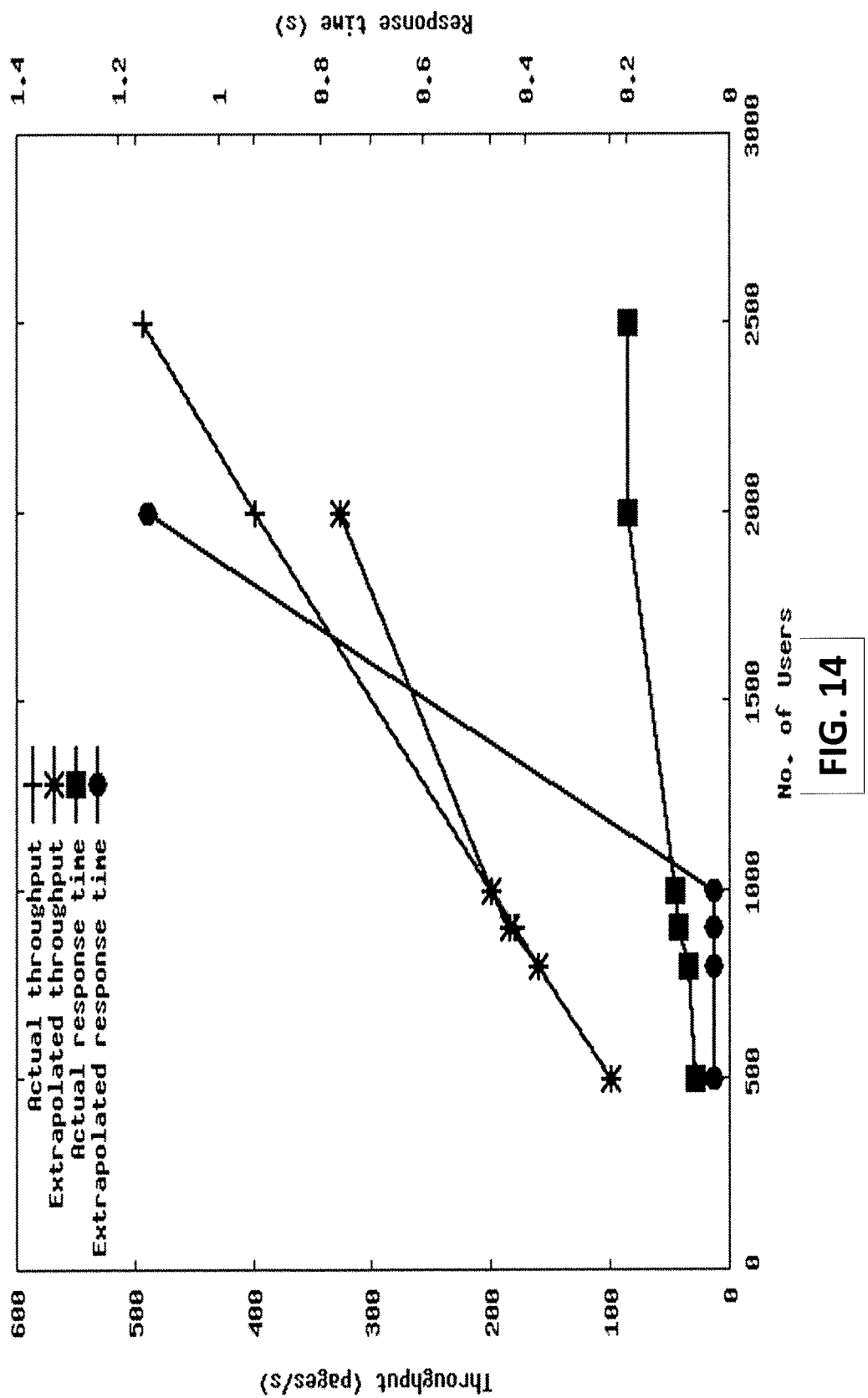
FIG. 14: shows a graph illustrating Application and trace throughput extrapolated on the target system and Application and trace response time extrapolated on the target system for equiz application during low end HDD to SDD migration in accordance with an exemplary embodiment of the present subject matter.
Figure 15:
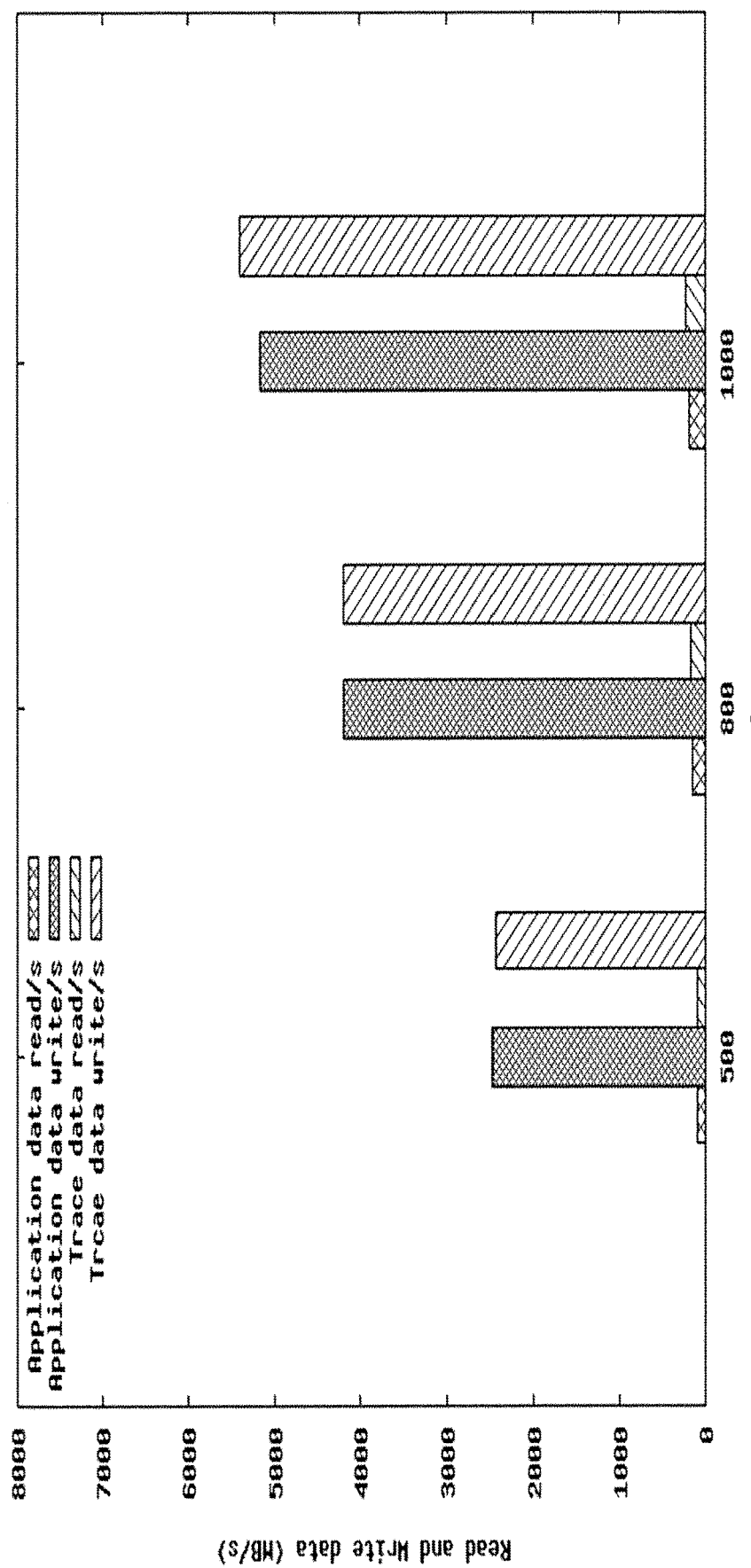
FIG. 15: shows a graph illustrating Application vs trace data transfer via read and write system calls for equiz application during low end HDD to SDD migration in accordance with an exemplary embodiment of the present subject matter.

For equiz application, the maximum disk utilization obtained by running actual application on the SSD is 46.26% for 2500 users while trace extrapolated value is 55.27% as shown in FIG. 13. Equiz application leads to a CPU bottleneck at 2500 users restricting further extrapolation. A negligible difference in throughput is observed between actual and extrapolated values particularly for smaller concurrency. Maximum difference is observed at maximum achievable concurrency of 2000 users with trace extrapolation as shown in FIG. 14. Though response time is predicted correctly for smaller concurrencies but a very large error in prediction is observed at very high concurrency as shown in FIG. 14. Also, we observed the same amount of data being read and written to the storage device by actual application and trace as shown in FIG. 15.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for explanatory purposes to aid the reader in understanding the principles of the invention and the concepts contributed by the inventor(s) to furthering the art, and are to be construed as being without limitation to such specifically recited examples and conditions.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for pre-deployment performance estimation of input-output intensive workloads in a distributed enterprise environment, the system comprising a processor, a memory, operatively coupled with said processor, the memory storing instructions executed by the processor comprising:

an I/O trace capture module configured to generate input-output traces of an application on a source system with varying concurrencies, wherein the input-output traces comprise one or more of a process ID, a timestamp value, or an offset and input-output system call;

an I/O trace replay module configured to replay the generated traces from the source system on a target system, wherein the target system is to which the application needs to be migrated, and to collect performance data in the form of resource utilization, through-put time and response time from the target system; and
an extrapolation module configured to extrapolate the data gathered from the target system in order to accurately predict the performance of multi-threaded input-output intensive application in the target system.

2. The system according to claim 1, wherein the extrapolation module is further configured to predict performance of multi-threaded input-output intensive application by implementing linear regression, sigmoid curve and black box techniques on the data gathered from the target system.

3. The system according to claim 1, wherein the I/O trace capture module is further configured to generate the input-output traces in a user mode wherein the user mode is a mode which requires no modification in the application or kernel.

4. The system according to claim 3, wherein the I/O trace capture module is further configured to:
create a multiple trace output files;
merge the multiple trace output files into a single file; and
sort the input-output system call corresponding to each of the merged multiple trace output files based on the timestamp value associated with the input-output system call.

5. The system according to claim 1, wherein the I/O trace replay module is further configured to:
copy the database files of the application to a temporary directory on the target system;
replace any access to the database file in the trace by path to the temporary directory; and
replay the generated traces from the source system on the target system wherein the replays are executed at the same time interval as in the source system.

6. A method for pre-deployment performance estimation of input-output intensive workloads in a distributed enterprise environment, said method implemented by a processor and comprising:
generating input-output traces of an application on a source system with varying concurrencies using an I/O trace capture module, wherein the input-output traces comprise one or more of a process ID, a timestamp value, or an offset and input-output system call;
replaying the generated traces from the source system on a target system wherein the target system is to which the application needs to be migrated using an I/O trace replay module;
collecting performance data in the form of resource utilization, through-put time and response time from the target system using the I/O trace replay module; and
extrapolating the data gathered from the target system in order to accurately predict the performance of multi-threaded input-output intensive application in the target system using an extrapolation module.

7. The method according to claim 6, wherein the input-output traces are generated in a user mode using the I/O trace capture module, wherein the user mode is a mode which requires no modification in the application or kernel.

8. The method according to claim 6, further comprising:
copying the database files of the application to a temporary directory on the target system;
replacing any access to the database file in the trace by path to the temporary directory; and
replaying the generated traces from the source system on the target system wherein the replays are executed at the same time interval as in the source system.

9. The method according to claim 6, wherein performance of multi-threaded input-output intensive application is predicted by implementing linear regression, sigmoid curve and black box techniques on the data gathered from the target system using the extrapolation module.

10. A computer program product for pre-deployment performance estimation of input-output intensive workloads in a distributed enterprise environment, the computer program product comprising a non-transitory computer readable storage medium having program instructions embodied therewith, the program instructions executable by a processor to cause the processor to perform a method comprising:
generating input-output traces of an application on a source system with varying concurrencies using an I/O trace capture module, wherein the input-output traces comprise one or more of a process ID, a timestamp value, or an offset and input-output system call;
replaying the generated traces from the source system on a target system wherein the target system is to which the application needs to be migrated using an I/O trace replay module;
collecting performance data in the form of resource utilization, through-put time and response time from the target system using the I/O trace replay module; and
extrapolating the data gathered from the target system in order to accurately predict the performance of multi-threaded input-output intensive application in the target system using an extrapolation module.

11. The computer program product of claim 10, further having embodied instructions for:
copying the database files of the application to a temporary directory on the target system;
replacing any access to the database file in the trace by path to the temporary directory; and
replaying the generated traces from the source system on the target system wherein the replays are executed at the same time interval as in the source system.

* * * * *